TELEVISION

Filed May 11, 1950 3 Sheets-Sheet 1

INVENTORS
Peter C. Goldmark
James J. Reeves
BY
Pennie, Edmonds, Morton and Barrows
ATTORNEYS INVENTORS
Peter C. Goldmark
James J. Reeves
BY
Pennie, Edmonds, Morton and Barrows
ATTORNEYS INVENTORS
Peter C. Goldmark
James J. Reeves
BY
Pennie, Edmonds, Morton and Barrows
ATTORNEYS 2,740,071

TELEVISION

Peter C. Goldmark, New Canaan, Conn., and James J. Reeves, New York, N. Y., assignors to Columbia Broadcasting System, Inc., New York, N. Y., a corporation of New York Application May 11, 1950, Serial No. 161,334

18 Claims. (Cl. 315—30)

This invention relates to television, and is particularly directed to improving the sharpness or crispness of reproduced television pictures. The invention is applicable to either black-and-white or color television systems, but is especially useful in color systems of the sequential type in order to improve picture sharpness when relatively narrow bandwidths are employed.

The reproduction of geometrical detail is an important problem in television. Although many factors are involved, the number of lines per frame, the number of field scansions per second (assuming interlaced scansion) and the bandwidth of the transmitter and receiver circuits are the most important. The vertical resolution of a television picture is largely a function of the number of lines per frame. When the number of lines per frame and the number of fields per second have been fixed, the horizontal resolution is largely a function of bandwidth. With present-day standards of 525 lines per frame, 60 fields double-interlaced per second, and a video bandwidth of approximately four megacycles, the horizontal resolution is somewhat less than the vertical resolution.

In the sequential type of color television system, for example, that described in Goldmark Patent 2,480,571, issued August 30, 1949, the field frequency is considerably higher than that employed in black-and-white television, and consequently a greater bandwidth is required to obtain the same horizontal and vertical resolution. Due to the great demand for channels in the radio frequency spectrum, it has been necessary to limit the bandwidth required for color television in order to increase the number of channels available for use, and serious efforts have been made to limit the video bandwidth employed in color television to that employed for black-and-white, namely, about four megacycles.

Although the addition of color more than compensates for the decrease in geometrical detail resulting from limited bandwidth, it is of course highly desirable to minimize such effects. Even in black-and-white television, any improvement in sharpness aids in equalizing the horizontal and vertical resolutions.

The present invention is directed to improving the sharpness or crispness of reproduced television pictures without changing the number of lines per frame or number of fields per second, and without requiring a wider transmission channel. It is particularly intended for use in home broadcast receivers. However, the invention can be employed in monitoring receivers at the broadcast station, and even in the transmission circuits where adequate bandwidth is provided after the crispening signals have been added.

In accordance with the broad aspects of the invention, a video signal is passed through a differentiating circuit which differentiates at least the higher frequency components of the signal. The differentiated signal is then supplied to the reproducing device, such as a cathode-ray tube, along with the normal video signal. Advantageously, a high-pass filter is inserted in the channel to the differentiating circuit so as to avoid overloading the differentiator with strong low-frequency signals.

The effect of adding the differentiated signal to the normal signal is to sharpen the outlines of objects and improve the contrast wherever there are sharp changes from one light level to another in the picture. The circuit appears to hasten the transition from black-to-white, or from white-to-black, so that improved contrast is obtained. The effect is observed not only at the edges of large objects but also in the fine detail of the reproduced image. For example, the whites of a person's eyes are more clearly discernible when the crispening circuit is employed.

Considerable improvement in the sharpness and crispness of pictures has been obtained by the use of a simple differentiating circuit, with or without a small amount of delay. Further improvement may be obtained by clipping the differentiated signal at a suitable level, amplifying it if required, and supplying it to the reproducing device along with the normal video. A small time delay between the differentiated signal and the normal signal is often advantageous to still further improve picture quality.

The invention will be more fully understood by reference to the following description of specific embodiments thereof, taken in conjunction with the drawings in which.

Figure 1:
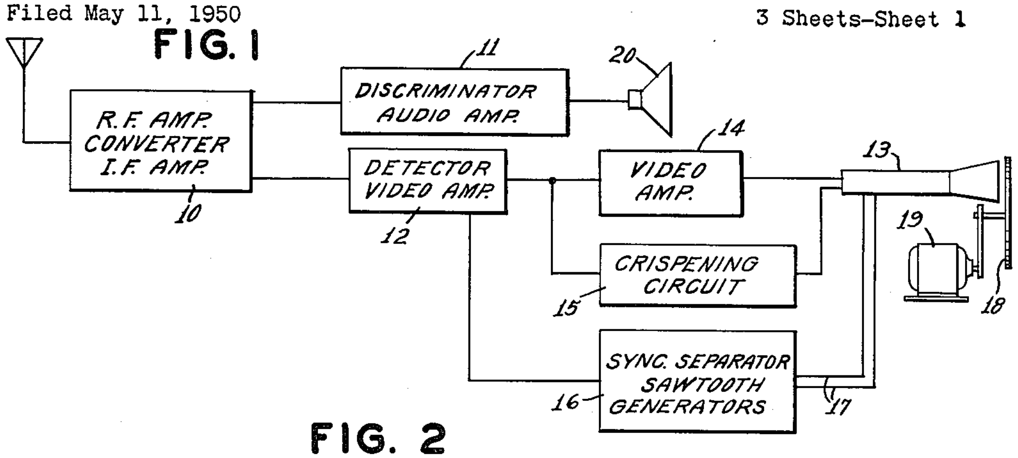
Fig. 1 is a block diagram of a color television receiver using the crispening circuit of the invention.

Referring now to Fig. 1, a television receiver is shown in which an incoming broadcast signal is amplified, converted to an intermediate frequency and further amplified in 10. The sound portion of the broadcast signal is extracted at a suitable point and fed to discriminator and audio amplifier 11 for reproduction by loudspeaker 20. The video signal is fed to detector and video amplifier 12. From 12, the video signal is supplied to cathode-ray tube 13 either with or without the interposition of an additional video amplifier 14. The video signal from 12 is also fed into the crispening circuit 15, and the output of this circuit is likewise supplied to cathode-ray tube 13. The video signal with accompanying synchronizing signals is also fed to a sync separating and sawtooth generating circuit 16 for supplying horizontal and vertical deflection waves to the cathode-ray tube via connections 17.

The description so far has been that of a black-and-white television receiver, and the invention may appropriately be employed in such a receiver. However, it has special usefulness in connection with a color television receiver of the sequential type, and accordingly Fig. 1 illustrates a color filter disk 18 rotating in front of the cathode-ray tube so as to display successive pictures in their proper colors. Filter disk 18 is driven by motor 19 through a belt drive. In order to maintain proper synchronism and phase relationship between the rotation of filter disk 18 and the reproduction of successive fields on the face of the cathode-ray tube, an appropriate motor control circuit may be provided in 16 and used to control the operation of motor 19.

Figure 2:
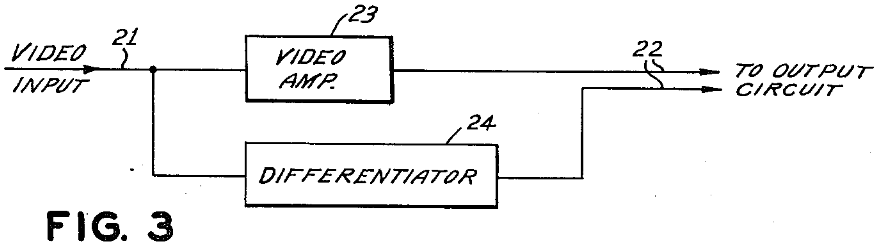
Fig. 2 is a simple block diagram illustrating one embodiment of the invention.

Fig. 2 shows a video input at 21 which is supplied directly to the output circuit at 22. The input at 21 may be derived from the detector and video amplifier 12 of ig. 1 and the output circuit at 22 may be the cathode-:y tube 13. A video amplifier 23 may be employed if ɜsired to increase the amplitude of the signals. The ·ispening circuit is here shown as a differentiating cir-iit 24 supplied with the video signals from 21. The fferentiated signal output is supplied to the output cir-iit 22 which may be the cathode-ray tube 13 of Fig. 1. the video amplifier 23 is employed, the output of differ-itiator 24 could be combined with the output of ampli-ɜr 23 and the resultant wave fed to the output circuit.

Figure 3:
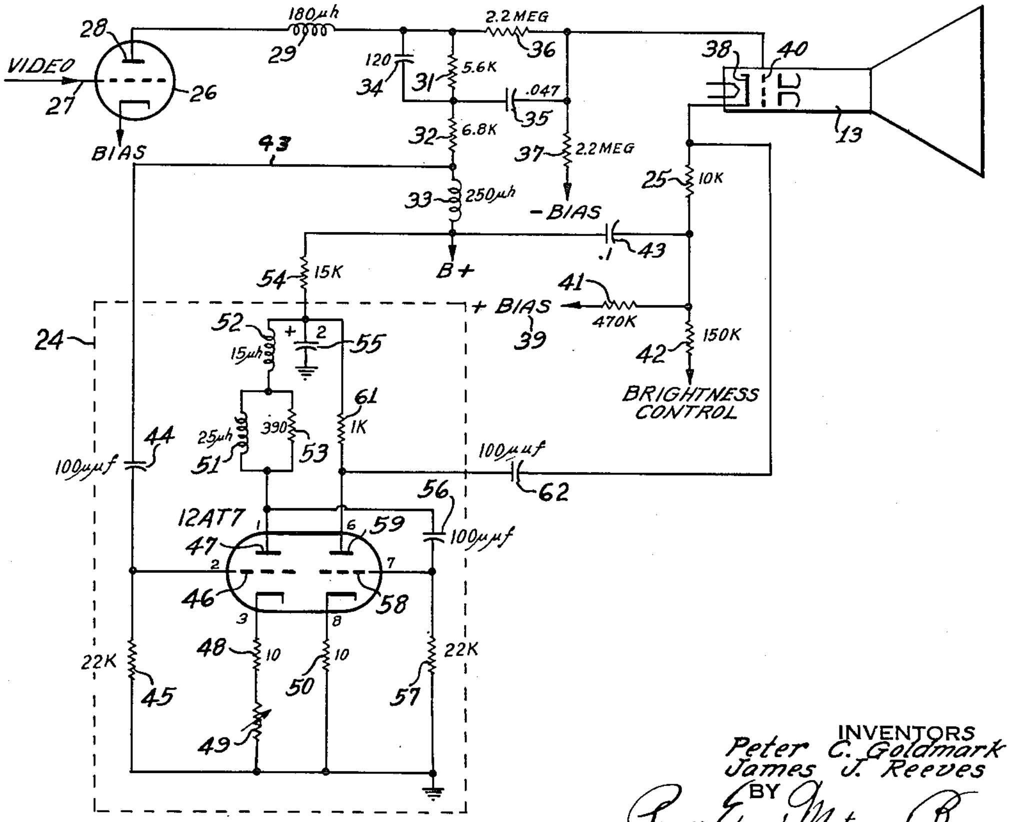
Fig. 3 is a circuit diagram of the output circuit of a representative television receiver, incorporating one embodiment of the circuit of the invention.

Fig. 3 is a circuit diagram corresponding to the block agram depicted in Fig. 2. In this circuit the differen-ating circuit which effects sharpening or crispening of .e image is enclosed by the dotted rectangle 24. The ·mainder of the circuit is that of a typical black-and-hite television receiver with the addition of resistor 25 the cathode circuit of the cathode-ray tube which lows insertion of the differentiated signal at the cathode.

Output tube 26 is supplied with the video signal at put 27 to the grid. Anode 28 is connected through ries peaking coil 29, load resistor 32, and peaking coil } to a suitable B+ power supply. Additional compen-.tion is provided by capacitor 34 shunting resistor 31. he video signal is supplied through coupling capacitor 5 to the grid of the cathode-ray tube 13. Suitable grid as for the cathode-ray tube is supplied by voltage di-ding resistors 36 and 37 in conjunction with the B+ ipply and a suitable source of negative voltage.

The bias on the cathode 38 of the cathode-ray tube obtained from a suitable source of positive voltage 39 conjunction with a variable D. C. voltage supply de-ɔted "brightness control." The brightness control volt-ȝe and the bias source 39 act through a voltage divider ·rmed by resistors 41 and 42 to supply the cathode bias. apacitor 43 serves to by-pass video frequencies. These rcuits are conventional and further elaboration is there-·re unnecessary.

The video signal is also supplied from the output circuit : tube 26 to the crispening circuit through lead 43. The gnal is applied to the grid 46 of tube section 47 rough an input circuit comprising coupling capacitor 44 ıd grid resistor 45. Tube section 47 is here shown as triode, but other types may be employed if desired. he time constant of the coupling circuit composed of ıpacitor 44 and resistor 45 is advantageously selected eliminate the low frequencies present in the video sig-il so as to avoid overloading triode section 47. Time ɔnstants of 2.2 and 4.7 microseconds have been em-oyed with success, but the values are not critical and ɔnsiderable variation is possible. Indeed, in some cases .e time constant may be selected so that no substantial tering takes place. A small resistance 48 is inserted in e cathode lead to triode section 47 to prevent parasitic ;cillations, and a rheostat 49 is inserted to control the ıin of the stage. If desired, this control may be omitted ıd the stage designed to yield the desired amplification.

The anode circuit of triode 47 contains a differentiating rcuit comprising inductances 51 and 52. The differen-ıting action is based on the formula $e=Ldi/dt$. The age is designed so that the anode current waveform is milar to the video signal applied to the grid, so that e output voltage waveform is substantially the differen-ıl of the applied video signal. Due to the fact that the deo signal to the differentiating circuit is taken from e junction of peaking inductance 33 and load resist-ıce 32, a certain amount of differentiation is contributed / inductance 33. The differentiation is then completed / tube 47 and the inductive differentiating circuit in its ıode circuit. The connection of lead 43 to the top of ductance 33 was selected so as to avoid adding capaci-nce to the normal video channel. In many cases the gnal to the differentiating circuit may be extracted from e video channel in such a manner that no preliminary fferentiation takes place. In this event the entire dif-rentiating action may be produced by the anode circuit of tube 47. Resistance 53 is inserted to provide a certain amount of damping, and its value may be selected depending upon the circuit constants employed. If desired, of course, this resistor may be omitted. Suitable anode voltage is supplied from B+ through the decoupling resistor 54 and by-pass condenser 55.

The differentiated signal in the anode circuit of triode section 47 is supplied through coupling capacitor 56 and grid resistor 57 to the grid 58 of the amplifier triode section 59. The time constant of the coupling circuit is advantageously such as to eliminate low frequencies to avoid overloading, and if desired may be made substantially the same as the input circuit to triode section 47. Anode voltage is applied from B+ through decoupling resistor 54 and load resistor 61. A small cathode resistor 50 is inserted to prevent parasitic oscillations. Resistors 48 and 50 may of course be omitted if unnecessary for stability.

The output of triode section 59 is fed through coupling capacitor 62 to the cathode 38 of the cathode-ray tube.

Figure 6:
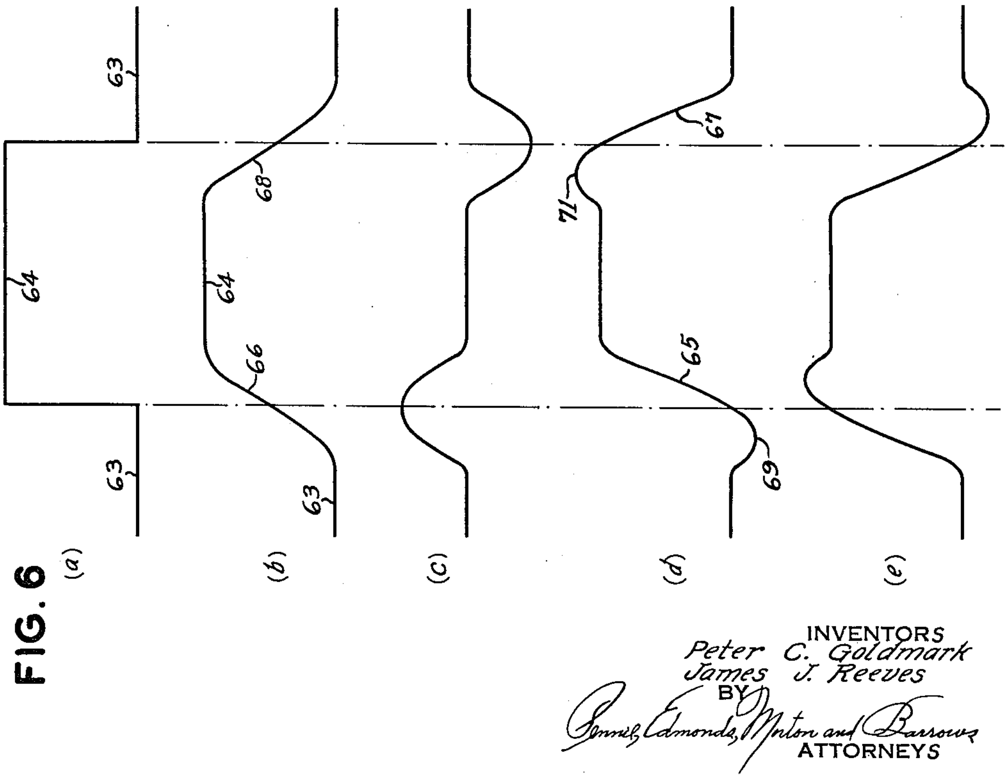
Fig. 6 shows waveforms illustrating the operation of the circuit of Fig. 3.

The operation of the circuit of Fig. 3 will be understood more fully by reference to the waveforms of Fig. 6.

Fig. 6*a* is a square wave representing an abrupt transition from black level 63 to white level 64 and back. Due to the limited bandwidth in the video circuits at the transmitter and receiver, this square wave will be distorted into a wave similar to that shown in Fig. 6*b*. The time of rise from black level 63 to white level 64, or vice versa, is in general $\frac{1}{2}f_0$, where $f_0$ is the highest frequency in the pass band. The waveform is that which would normally be applied to grid 40 of the cathode-ray tube. No attempt has been made to show the exact phase between the waves of Fig. 6*a* and *b*, inasmuch as considerable change may take place in the transmitter and receiver circuits.

The waveform of Fig. 6*b* may be applied directly to differentiating tube 47. However, as before mentioned, the connection of lead 43 between peaking inductance 33 and load resistance 32 has the effect of providing a certain amount of differentiation which is completed by the differentiating circuit in the output of tube 47. Also, the connection has the effect of discriminating against the low-frequency signal components while passing the high-frequency components to tube 47.

With the differentiating action of the anode circuit of triode 47, an output wave will be developed which, when inverted in phase by the subsequent amplifying section 59, is similar to that shown in Figs. 6*c*. The differentiated wave in Fig. 6*c* is shown in time phase with the wave of Fig. 6*b*. Inasmuch as the wave of Fig. 6*b* is applied to grid of the cathode-ray tube, whereas the wave of Fig. 6*c* is applied to the cathode, the net effect on the picture reproduction is as though they were subtracted, yielding the wave shown in Fig. 6*d*.

It is clearly apparent that the slope of the rise 65 in Fig. 6*d* is much greater than the rise 66 of Fig. 6*b*. Likewise, the fall 67 is Fig. 6*d* is faster than the fall 68 in Fig. 6*b*. Consequently, when the differentiated signal is supplied to the cathode-ray tube the transition from black-to-white and from white-to-black is much faster than that produced by the video signal alone. Hence the apparent contrast and sharpness of the picture is considerably increased.

It will be noted that there is a slight undershoot 69 and overshoot 71 in the wave of Fig. 6*d*, but this has not been found to be particularly objectionable unless it becomes excessive. Indeed, undershoots and overshoots of 10% of the signal amplitude are often helpful in clearly delineating detail. The undershoot and overshoot in Fig. 6*d* is somewhat greater than 10% but the added crispness of the image is found to more than offset any deleterious effects. The amount of undershoot and overshoot may be controlled by varying the amplitude of the differentiated signal by means of rheostat 49. With smaller amounts of differentiated signal the undershoot and overshoot is reduced, but the time of rise and fall is increased. Amplitudes approximately as shown, with the differentiated signal about half the amplitude of the square wave, have been employed with success and have given good results. However, they may be changed to suit the judgment of the designer.

It will also be noted that there is some phase shift of slopes 65 and 67 with respect to slopes 66 and 68 of Fig. 6*b*. Inasmuch as the phase shift is constant for the higher frequencies, this has not been found to be objectionable.

If desired, the differentiated signal of Fig. 6*c* may be added in phase with the signal of Fig. 6*b* to yield the resultant illustrated in Fig. 6*e*. This can be accomplished by using another phase inverting stage between the differentiating circuit and the cathode of the cathode-ray tube, or by providing suitable circuit means for inserting both signals at the grid of the cathode-ray tube, or by other appropriate means. Suitable means for directly combining the differentiating signal and the video signal will be described in connection with Fig. 5.

In some television receivers there is excessive delay of the high frequencies with respect to the low frequencies in the normal video channel. As a result the wave of Fig. 6*b* may overshoot on the top of rise 66 and at the bottom of 68. In such case the subtraction of the differentiated signal yielding the wave of Fig. 6*d* may be preferable to the addition illustrated in Fig. 6*e*, in order to avoid further increasing the amount of overshoot. Indeed, in some cases the subtracted differentiated signal may partially compensate for the excessive high frequency delay in the normal channel.

The frequencies which are important in producing rapid transitions from white to black and vice versa are predominantly those in the upper portion of the pass band. With a differentiating circuit, for example, that shown in Fig. 3, the voltage output at the lower frequencies is small, and the effect of the differentiation increases with frequency. Thus the differentiation is most effective where it is most needed. It is desirable, when using a triode for the differentiating circuit, to select the inductances such that their reactances are considerably lower than the plate resistance of the tube over most or all of the normal bandwidth. Thus the stage operates essentially as a constant current stage.

The values of the circuit components shown in Fig. 3 are those used in a specific embodiment whch has been operated with success. They are intended merely as an aid to the ready practice of the invention and may be departed from widely depending upon the application and the judgment of the designer.

Figure 4:
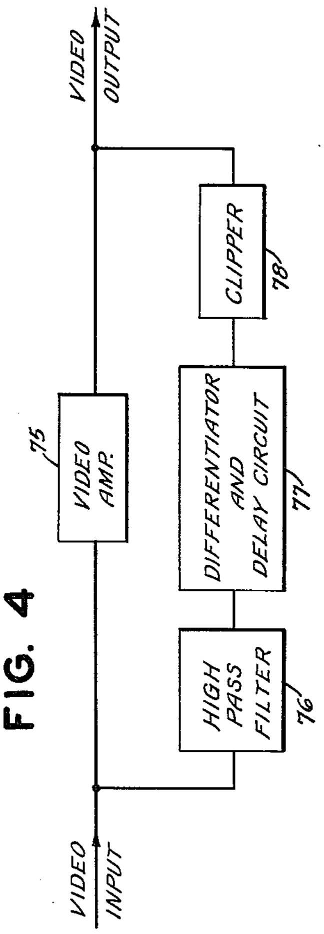
Fig. 4 is a block diagram of another embodiment of the invention.

Referring now to Fig. 4, a more elaborate embodiment is shown which is advantageous in many cases where the additional cost is permissible. As shown in block form, the video signal is fed through an amplifier 75 from the input to the output circuits. The video signal is also fed through a high-pass filter 76 which eliminates the low-frequency components thereof, and then to a differentiator and delay circuit 77 which produces a differentiated signal in a manner similar to that described above. The purpose of the delay will be discussed hereinafter. The differentiated signal is then fed to the output circuit through a clipper or peak separator 78 which shortens the length of the differentiated pulses and increases their high-frequency content.

Figure 5:
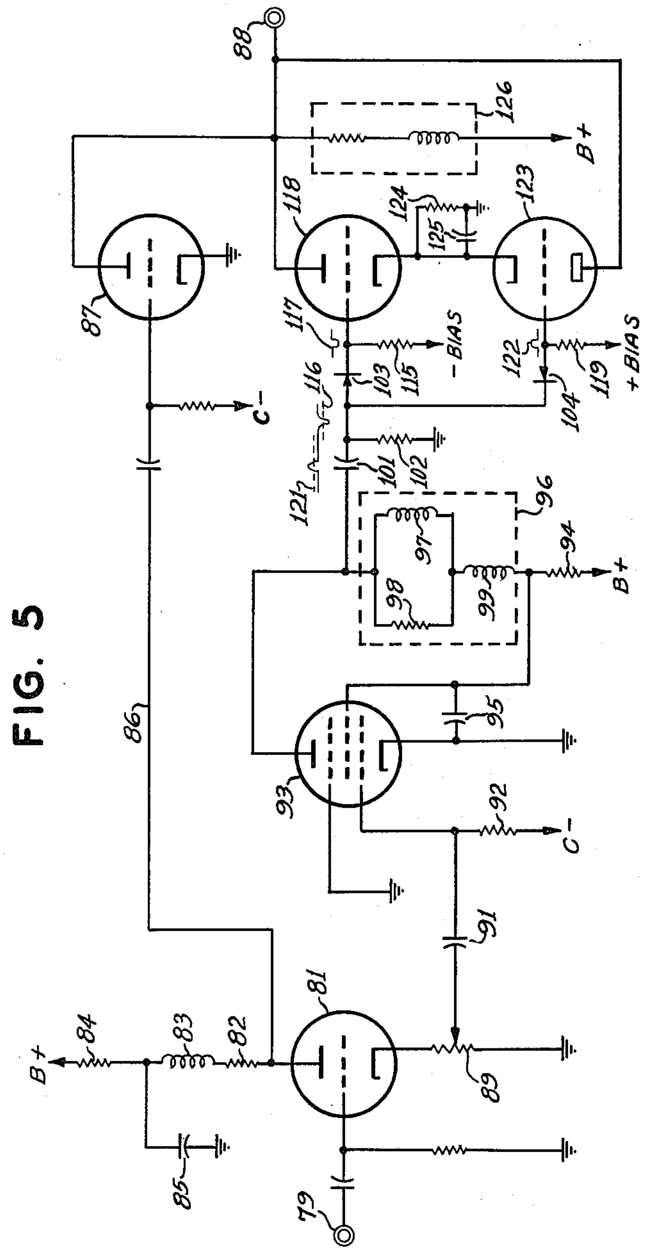
Fig. 5 is a circuit diagram of the embodiment of Fig. 4.

A circuit diagram following the arrangement of Fig. 4 is shown in Fig. 5. An input video signal at terminal 79 is fed through an input circuit to the grid of amplifier tube 81. The anode circuit of tube 81 includes a load resistance 82 and peaking inductance 83 and is supplied with a voltage from a suitable B+ source through decoupling resistor 84 and capacitor 85. The output video signal at the anode is supplied through lead 86 and a suitable coupling network to amplifier tube 87 and thence to output terminal 88.

The video signal in the cathode circuit of tube 81 is supplied from an adjustable potentiometer 89 through coupling capacitor 91 and grid resistor 92 to the control grid of tube 93. The time constant of the coupling circuit is advantageously selected to eliminate low-frequency components and thereby prevent overloading tube 93, as described in connection with Fig. 3. Amplifier 93 is here shown as of the pentode type with its cathode grounded, the screen grid supplied with suitable voltage from B+ through decoupling resistor 94 and capacitor 95, and the suppressor grid grounded.

The anode circuit includes the differentiating circuit indicated by the dotted outline 96. The differentiating circuit is composed of inductance 97 shunted by resistance 98, and a series inductance 99. This circuit functions similarly to that shown in Fig. 3 and need not be described again.

The differentiated signal is then fed through coupling capacitor 101 and resistor 102 to two oppositely poled crystal rectifiers 103 and 104. Crystal rectifier 103 is supplied with a suitable negative bias through resistor 115 which is adjusted to clip the differentiated signal at a selected point below the A. C. axis thereof as indicated by dotted line 116. The resultant separated negative peaks such as represented at 117 are supplied to the control grid of tube 118.

Rectifier 104 is supplied with a suitable positive bias through resistor 119 to clip the applied differentiated signal at a selected point above the A. C. axis such as represented by dotted line 121. The resultant separated positive peaks as represented at 122 are fed to the control grid of tube 123. Suitable bias for tubes 118 and 123 is supplied by the common cathode bias circuit composed of resistor 124 and capacitor 125. The negative and positive bias applied to the grids of tubes 118 and 123 through resistors 115 and 119 will ordinarily be small compared to the cathode bias. Hence the tubes will operate on similar portions of their characteristics.

A common output load circuit denoted 126 is employed for tubes 118 and 123, and also for tube 87 in the normal video channel. Hence the output signal appearing at terminal 88 includes the normal video signal and the negative and positive peaks of the differentiated signal. The output signal may be passed directly to the control grid or cathode of a cathode-ray tube for reproduction. If desired, however, subsequent amplification may be provided, in which case it is desirable to employ considerably wider bandwidths than that employed in the normal video channel.

Figure 7:
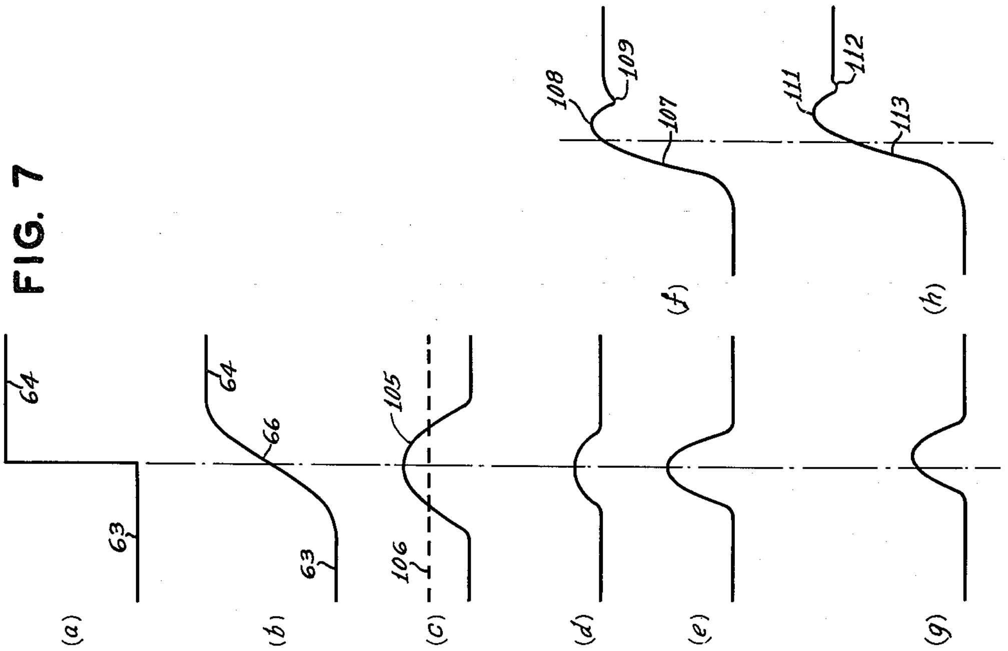
Fig. 7 shows waveforms illustrating the operation of the circuit of Fig. 5.

The functioning of the circuit of Fig. 5 will be understood more clearly by a consideration of the waveforms of Fig. 7. Figs. 7*a*, *b* and *c* are similar to Figs. 6*a*, *b* and *c* but represent only the first portion of the waves, for simplicity. The differentiated signal 105 is the signal supplied from the output of tube 93 to the crystal rectifiers. It is here assumed that the clipping level of rectifier 104 has been set at line 106, so that only the upper portion of the pulse is allowed to pass. This upper portion of the pulse is shown in Fig. 7*d*. The subsequent amplification in tube 123 is such as to increase the amplitude of the clipped portion to that shown in Fig. 7*e*. Waves 7*e* and 7*b* are added in the output circuit of tubes 123 and 87, and the resultant wave appearing at terminal 88 is that shown in Fig. 7*f*. It will be noted that the rise time represented by slope 107 is substantially greater than slope 66 of Fig. 7*b*, and is somewhat greater than that shown in Fig. 6*e*. The overshoot 108 is somewhat smaller than the overshoot in Fig. 6*a* but is accomplished by a slight undershoot 109. The small amounts of overharmful and, if harmful at all, are more than offset by the increase in sharpness and crispness due to the shorter rise time.

While Fig. 7 illustrates the effect of the crispening ciruit only for transitions from black to white, it will be nderstood that a similar effect takes place for transitions :om white to black, in which case clipping rectifier 103 omes into play.

A small amount of phase shift between the normal ideo signal and the differentiated signal at the output ircuit may often be employed with advantage. Generally peaking the amount of phase shift is small compared to ne half-period of the highest frequency in the normal ideo pass band, that is, small compared to $\frac{1}{2}f_0$. By mploying such phase shift, and also by adjusting the mplitude of the differentiated and clipped signal, the mounts of overshoot and undershoot may be altered vithin limits.

Fig. 7*g* shows a differentiated and clipped pulse which s similar to that of Fig. 7*e* except that it has a slightly maller amplitude and has been delayed approximately 0% of the rise time. The result of adding the waves of 'igs 7*g* and 7*b* is shown in Fig. 7*h*. It will be noted that nere is a slightly greater overshoot 111 but a considerably maller undershoot 112. Also, the slope 113 is more early in phase with the center of the transition from lack-to-white shown in Fig. 7*b*.

It will be apparent that by selecting different clipping evels for rectifiers 103 and 104, by selecting different mplitudes of the output differentiated pulse which is to e combined with the original video signal, and by adjusting the delay of the differentiated signal, various derees of rise time, overshoot and undershoot may be obained. Also the phase of the rise may be altered. The ombined waves illustrated in Figs. 7*f* and 7*h* have been ound to give good results in practice, but the exact shape nay be altered within the judgment of the designer.

The delay described in connection with Fig. 7*g* may be btained in any convenient manner. In designing the diferentiating circuit 96, a certain amount of delay may be ncorporated therein which will produce the desired effect. Alternatively, additional delay means could be inserted. On the other hand, phase-shifting means may be inorporated in the video channel, or in both channels to ive the desired relative phase.

In the foregoing description two specific embodiments of the invention have been described and illustrative waveorms given. It will be understood that the precise opertion of circuits of this character is somewhat difficult to scertain under all conditions of use. Therefore, although he theory presented is believed to be essentially correct, t is not insisted upon and may be subject to considerably nore elaboration. Regardless of theory, it has been asertained by test that the circuits described do improve he sharpness and crispness of television images and have onsiderable value when video bandwidths are limited. ndeed, it is quite possible that some improvement will be btained even with normally adequate bandwidths.

Although two embodiments have been described, many nodifications and variations are possible within the scope of the invention. In particular, although the type of lifferentiating network illustrated has been found to be ery satisfactory, other types may be employed if desired. Resistance-capacitance differentiating circuits may often e suitable, particularly where low impedance sources are vailable.

Furthermore, it is not necessary that the crispening network feed directly into the reproducing device, here hown as a cathode-ray tube. It could be inserted earlier n the video channels if desired. In such case it is desirble to increase the bandwith of the channel between he crispening network and the reproducing device so that he increased sharpness of the image will not be lost due o subsequent impairment of the frequency components of the differentiated signal. In general the bandwidth of he circuits after the crispening signal has been added hould be of the order of twice the normal bandwidth. Thus, if the normal bandwidth is four megacycles, the circuits subsequent to the crispening network should preferably have a bandwidth extending to approximately eight megacycles, and even more would be advantageous if clipping is employed.

In addition to the variations and modifications suggested in the foregoing description, others will no doubt occur to those skilled in the art within the scope of the invention.

We claim:

1. In a television receiver having a picture reproducing device, apparatus for improving the crispness of reproduced pictures which comprises circuit means for supplying a video signal having frequency components within a predetermined bandwidth to said reproducing device, a differentiating circuit supplied with said video signal and adapted to differentiate at least the higher frequency components thereof within said predetermined bandwidth to yield substantially only the differentiated signal components thereof, and circuit connections for supplying differentiated signal components from said differentiating circuit to said reproducing device.

2. In a television receiver having a picture reproducing device, apparatus for improving the crispness of reproduced pictures which comprises circuit means for supplying a video signal having frequency components within a predetermined bandwidth to said reproducing device, a filter circuit supplied with said video signal and designed and adapted to substantially remove the lower frequency components thereof and pass the higher frequency components thereof within said predetermined bandwidth, a differentiating circuit connected to the output of said filter circuit and adapted to differentiate said higher frequency components of the video signal to yield substantially only the differentiated signal components thereof, and circuit connections for supplying differentiated signal components from said differentiating circuit to said reproducing device.

3. In a television receiver having a picture reproducing device, apparatus for improving the crispness of reproduced pictures which comprises a video amplifier connected to supply a video signal to said reproducing device, said amplifier having a predetermined video bandwidth, a vacuum tube having an input control circuit and an anode output circuit, connections between said video amplifier and said input circuit to supply said video signal to said tube, an inductive differentiating circuit in said anode output circuit adapted to differentiate at least the higher frequency components of said video signal within said predetermined bandwidth to yield substantially only the differentiated signal components thereof, and circuit connections between said output circuit and said reproducing device to supply differentiated signal components thereto, whereby differentiated signal components are supplied to said reproducing device together with said video signal to improve the crispness of the reproduced image.

4. In a television receiver having a picture reproducing device, apparatus for improving the crispness of reproduced pictures which comprises a video amplifier connected to supply a video signal to said reproducing device, said amplifier having a predetermined video bandwidth, a high pass filter connected to said video amplifier to receive said video signal therefrom and adapted to substantially remove the lower frequency components within said bandwidth and pass the higher frequency components, a vacuum tube having an input control circuit and an anode output circuit, connections between said filter and said input circuit to supply said higher frequency components to said tube, an inductive differentiating circuit in said anode output circuit having a reactance at the highest frequency within said video bandwidth which is low in comparison with the impedance of said tube to yield a differentiated signal wave corresponding to said higher frequency components, and circuit connections between said output circuit and said reproducing device to supply said differentiated signal wave thereto, whereby said differentiated signal wave is supplied to said reproducing device together with said video signal to improve the crispness of the reproduced image.

5. In a television receiver including a picture reproducing device having beam intensity controlling means, apparatus for improving the crispness of reproduced pictures which comprises circuit means for supplying a video signal to the beam intensity controlling means of said reproducing device, a differentiating circuit supplied with said video signal and adapted to differentiate at least the higher frequency components thereof, a peak separating circuit supplied with the differentiated signal from said differentiating circuit and adapted to pass only the peak portions thereof, and circuit connections between said peak separating circuit and the beam intensity controlling means of said reproducing device to supply the peak portions of the differentiated signal thereto.

6. In a television receiver having a picture reproducing device, apparatus for improving the crispness of reproduced pictures which comprises circuit means for supplying a video signal to said reproducing device, a filter circuit supplied with said video signal and designed and adapted to substantially remove the lower frequency components thereof and pass the higher frequency components thereof, a differentiating circuit connected to the output of said filter circuit and adapted to differentiate said higher frequency components of the video signal, a clipping circuit connected to the output of said differentiating circuit to receive the differentiated signal therefrom, said clipping circuit passing substantially only the peak portions of the differentiated signal, and circuit connections between said clipping circuit and said reproducing device to supply the peak portions of the differentiated signal thereto for reproduction.

7. In a television receiver having a picture reproducing device, apparatus for improving the crispness of reproduced pictures which comprises a video amplifier connected to supply a video signal to said reproducing device, said amplifier having a predetermined video bandwidth, a vacuum tube having and input control circuit and an anode output circuit, connections between said video amplifier and said input circuit to supply said video signal to said tube, an inductive differentiating circuit in said anode output circuit adapted to differentiate at least the higher frequency components of said video signal to yield a corresponding differentiated signal wave, a clipping circuit connected to said output circuit to receive the differentiated signal therefrom, said clipping circuit passing substantially only the peak portions of the differentiated signal, and circuit connections between said clipping circuit and said reproducing device to supply the peak portions of the differentiated signal thereto for reproduction, whereby said differentiated signal wave is supplied to said reproducing device together with said video signal to improve the crispness of the reproduced image.

8. In a television receiver having a picture reproducing device, apparatus for improving the crispness of reproduced pictures which comprises a video amplifier connected to supply a video signal to said reproducing device, said amplifier having a predetermined video bandwidth, a high pass filter connected to said video amplifier to receive said video signal therefrom and adapted to substantially remove the lower frequency components within said bandwidth and pass the higher frequency components, a vacuum tube having an input control circuit and an anode output circuit, connections between said filter and said input circuit to supply said higher frequency components to said tube, an inductive differentiating circuit in said anode output circuit to yield a differentiated signal wave corresponding to said higher frequency components, a clipping circuit connected to said output circuit to receive the differentiated signal therefrom, said clipping circuit passing substantially only the peak portions of the differentiated signal, and circuit connections between said clipping circuit and said reproducing device to supply the peak portions of the differentiated signal thereto for reproduction, whereby said differentiated signal wave is supplied to said reproducing device together with said video signal to improve the crispness of the reproduced image.

9. In a television receiver having a picture reproducing device, apparatus for improving the crispness of reproduced pictures which comprises a video amplifier connected to supply a video signal to said reproducing device, said amplifier having a predetermined video bandwidth, a differentiating circuit connected to said video amplifier to receive said video signal and adapted to differentiate at least the higher frequency components thereof to yield a corresponding differentiated signal wave, a clipping circuit connected to said differentiating circuit and adapted to clip said differentiated signal wave in positive and negative directions to pass only positive and negative peak portions thereof, and circuit connections between said clipping circuit and said reproducing device to supply the peak portions of the differentiated signal thereto for reproduction, whereby said differentiated signal wave is supplied to said reproducing device together with said video signal to improve the crispness of the reproduced image.

10. In a television receiver having a picture reproducing device, apparatus for improving the crispness of reproduced pictures which comprises a video signal channel for supplying a video signal having frequency components within a predetermined bandwidth to said reproducing device, a differentiating channel supplied with said video signal, said differentiating channel being designed and adapted to differentiate at least the higher frequency components of said video signal within said predetermined bandwidth to yield substantially only the differentiated signal components thereof, circuit connections for supplying differentiated components from said differentiating channel to said reproducing device, and phase-shifting means in one of said channels for shifting the relative phase of said video and differentiated signals.

11. In a television receiver having a picture reproducing device, apparatus for improving the crispness of reproduced pictures which comprises a video signal source, a video signal channel connecting said source with said reproducing device to supply said video signal thereto, a differentiating channel connected to said source to receive said video signal, a differentiating circuit in said differentiating channel designed and adapted to differentiate at least the higher frequency components of said video signal to yield a corresponding differentiated signal, a clipping circuit connected to the output of said differentiating circuit to receive the differentiated signal therefrom, said clipping circuit passing substantially only the peak portions of the differentiated signal, circuit connections between said clipping circuit and said reproducing device to supply the clipped differentiated signal thereto for reproduction, and phase-shifting means in one of said channels for shifting the relative phase of said video and clipped differentiated signal as supplied to said reproducing device.

12. In a television receiver having a picture reproducing device, apparatus for improving the crispness of reproduced pictures which comprises a video signal source, a video signal channel connecting said source with said reproducing device to supply said video signal thereto, a differentiating channel connected to said source to receive said video signal, a differentiating circuit in said differentiating channel designed and adapted to differentiate at least the higher frequency components of said video signal to yield a corresponding differentiated signal, a clipping circuit connected to said differentiating circuit and adapted to clip said differentiated signal wave in positive and negative directions to pass only positive and negative peak portions thereof, circuit connections between said clipping circuit and said reproducing device to supply the clipped differentiated signal thereto for reproduction, and phase-shifting means in said differentiating channel adapted to delay said clipped differentiated signal a small amount with respect to said video signal as supplied to said reproducing device.

13. In a television video circuit having an input circuit and an output circuit, the combination which comprises circuit connections for supplying a video signal having frequency components within a predetermined bandwidth from said input circuit to said output circuit, a differentiating circuit supplied from said input circuit and adapted to differentiate at least the higher frequency components of said video signal within said predetermined bandwidth to yield substantially only the differentiated signal components thereof, and circuit connections for supplying differentiated signal components from said differentiating circuit to said output circuit.

14. In a television video circuit having an input circuit and an output circuit, apparatus for improving the crispness of pictures reproduced from a video signal which comprises a first circuit connected to supply a video signal having frequency components within a predetermined bandwidth from said input circuit to said output circuit, a differentiating circuit supplied from said input circuit in shunt with said circuit and adapted to differentiate at least the higher frequency components of said video signal within said predetermined bandwidth to yield substantially only the differentiated signal components thereof, and circuit connections for supplying differentiated signal components from said differentiating circuit to said output circuit.

15. In a television receiver having a picture reproducing device, the method of improving the crispness of reproduced pictures which comprises supplying a video signal having frequency components within a predetermined bandwidth to said reproducing device for reproduction, differentiating at least the higher frequency components of said video signal within said predetermined bandwith to yield substantially only the differentiated signal components thereof, and supplying said differentiated signal components to said reproducing device for reproduction.

16. In a television receiver including a picture reproducing device having beam intensity controlling means, the method of improving the crispness of reproduced pictures which comprises supplying a video signal to the beam intensity controlling means of said reproducing device for reproduction, differentiating at least the higher frequency components of said video signal to yield a differentiated signal, separating the peaks of said differentiated signal from the remainder thereof, and supplying said separated peaks to the beam intensity controlling means of said reproducing device for reproduction.

17. In a television video circuit having an input circuit and an output circuit, apparatus for improving the crispness of pictures reproduced from a video signal which comprises a first channel connected to supply a video signal having frequency components within a predetermined bandwidth from said input circuit to said output circuit, a second channel supplied from said input circuit in shunt with said first channel and including a differentiating circuit adapted to differentiate at least the higher frequency components of said video signal within said predetermined bandwith to yield substantially only the differentiated signal components thereof, and connections for supplying differentiated signal components from said second channel to said output circuit.

18. In a television video circuit having an input circuit and an output circuit, apparatus for improving the crispness of pictures reproduced from a video signal which comprises a first channel connected to supply a video signal having frequency components within a predetermined bandwidth from said input circuit to said output circuit, a second channel supplied from said input circuit in shunt with said first channel and including a differentiating circuit adapted to differentiate at least the higher frequency components of said video signal within said predetermined bandwidth to yield substantially only the differentiated signal components thereof, said second channel including a peak-separating circuit supplied from said differentiating circuit and adapted to pass only the peak portions of the differentiated signal components, and connections for supplying the output of said second channel to said output circuit.

References Cited in the file of this patent

UNITED STATES PATENTS

| | | |
|---|---|---|
| 2,116,671 | Dowsett et al. | May 10, 1938 |
| 2,240,281 | Ballard | Apr. 29, 1941 |
| 2,243,599 | Herbst | May 27, 1941 |
| 2,254,114 | Wilson | Aug. 26, 1941 |
| 2,255,691 | Wilson | Sept. 9, 1941 |
| 2,263,376 | Blumlein | Nov. 18, 1941 |
| 2,273,163 | Wilson | Feb. 17, 1942 |
| 2,296,050 | Poch | Sept. 15, 1942 |
| 2,344,810 | Fredendall et al. | Mar. 21, 1944 |
| 2,386,728 | Theisen | Oct. 9, 1945 |
| 2,463,969 | Hulst, Jr. | Mar. 8, 1949 |
| 2,700,741 | Brown | Jan. 25, 1955 |